July 18, 1961  J. T. ELLIS, JR  2,992,815
SHOCK ABSORBER
Filed July 16, 1959  2 Sheets-Sheet 1
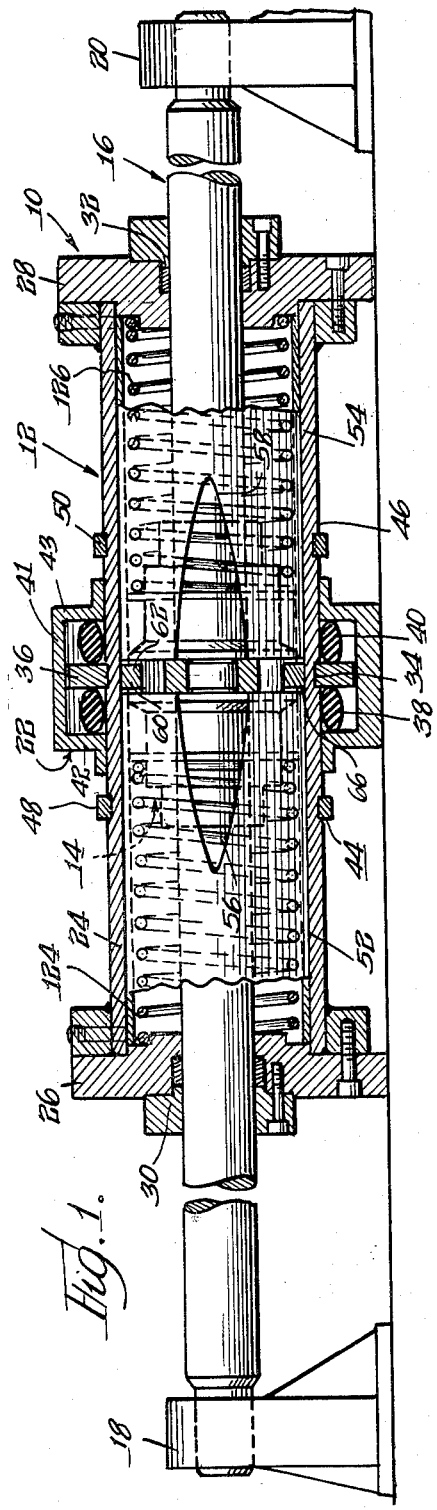
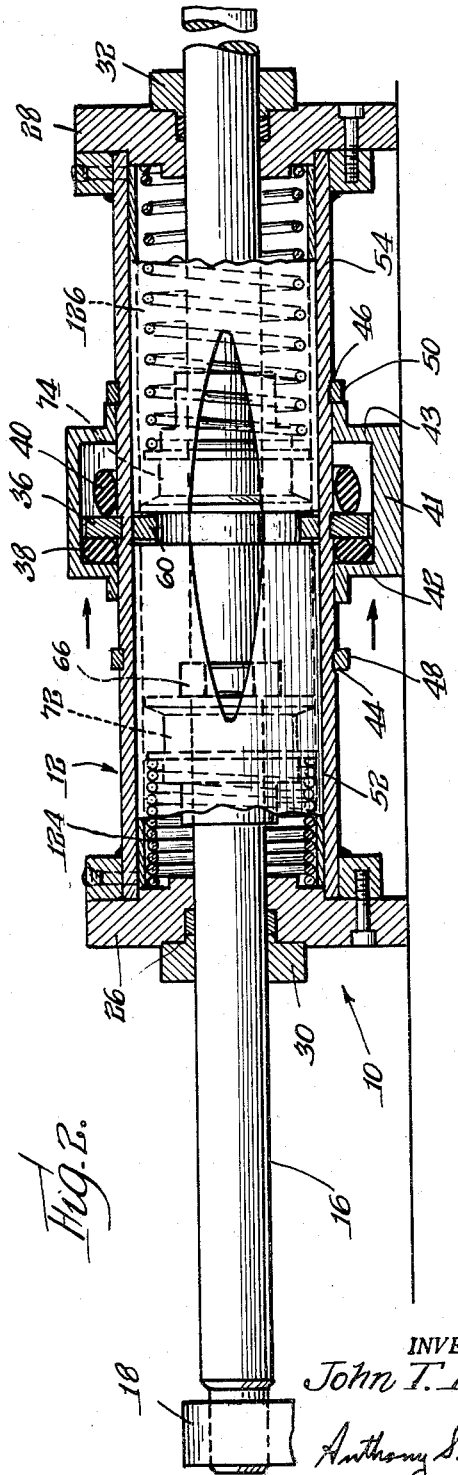
INVENTOR.
John T. Ellis, Jr.
Anthony S. Zummer
Atty

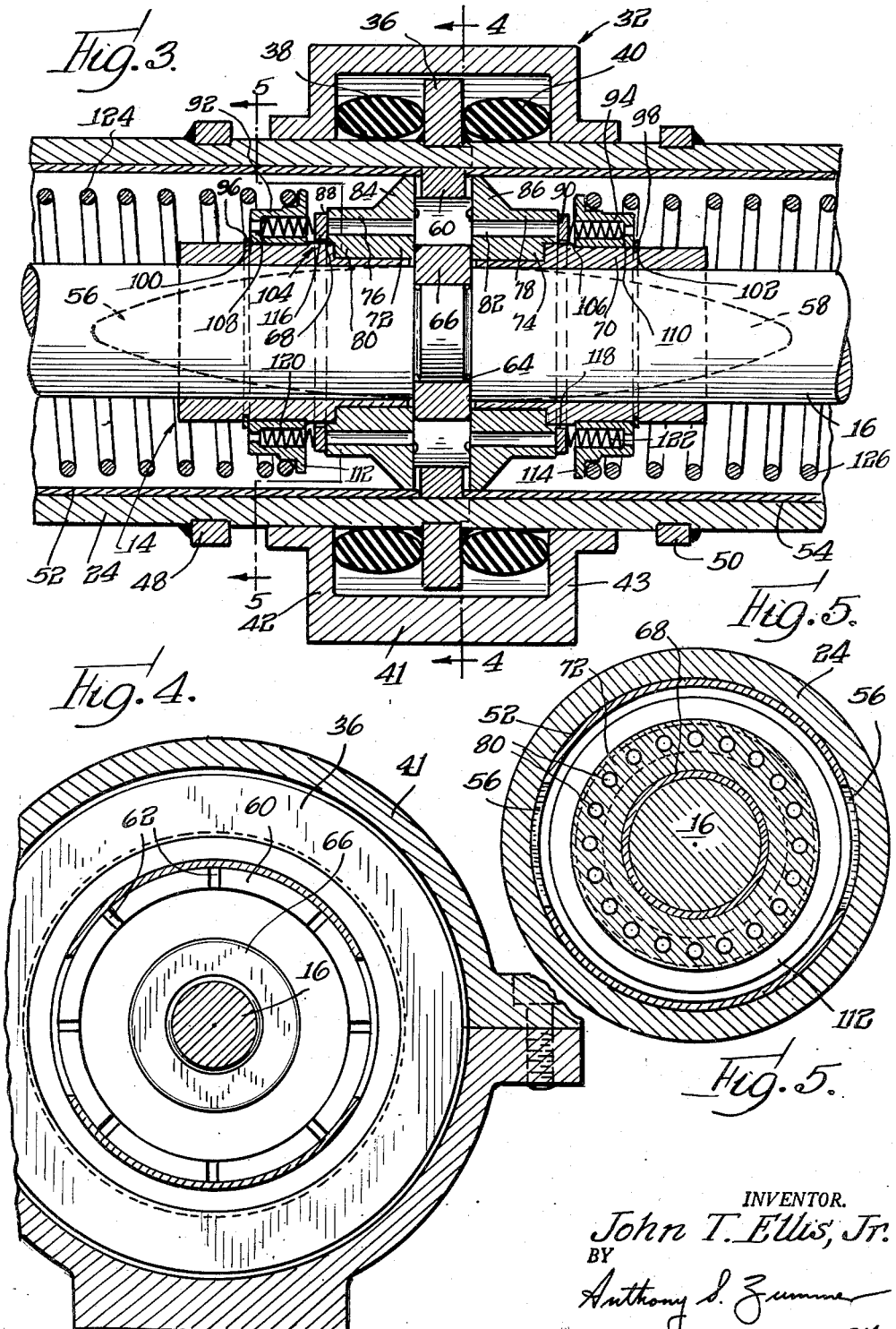

United States Patent Office 2,992,815
Patented July 18, 1961

2,992,815
SHOCK ABSORBER
John T. Ellis, Jr., Maine Township, Cook County, Ill., assignor to Hanna Engineering Works, Chicago, Ill., a corporation of Illinois
Filed July 16, 1959, Ser. No. 827,572
8 Claims. (Cl. 267—8)

This invention relates to an improvement in shock absorbers and more specifically to an improved construction for double acting shock absorbers.

Shock absorbers have extensive usage in many and varied applications. In most applications it is desirable for a shock absorber to have a fixed rate of loading. One of the common types of shock absorbers having a fixed rate of loading is one which has grooves in its tube wall, so that the rate of loading is accurately determined and remains constant during the shock absorber's life. However, grooved tubular walls are expensive to make, inasmuch as they are usually made by broaching or some other similar process. A slight error on the part of a machinist during broaching may destroy the entire tube wall or render it unfit for the designed use.

Double acting shock absorbers are normally used in applications wherein the load is applied from either direction along the longitudinal axis of the shock absorber. In many operations it is imperative that the shock absorber return to its exact original position. Many shock absorbers are constructed so that return springs hold the shock absorber in a null or balanced position. However, the position depends upon the balance of springs. This type of arrangement is not desirable when a return to an exact position is required. Spring charcteristics often change as the springs are placed under repeated loading, so that the center or balanced position of the shock absorber shifts as a result of usage.

Another problem appurtenant hydraulic shock absorbers which have a substantial size is that an accumulator of some type is required to prevent air from being drawn into the shock absorber and contaminating the fluid. Accumulators are expensive to manufacturer and often prove to be the source of maintenance problems.

It is one of the objects of the instant invention to provide a double acting shock absorber which has a fixed null or balanced position, which position does not change during usage.

It is another object of the present invention to provide a hydraulic shock absorber which does not require an accumulator.

It is a still further object of the instant invention to provide a shock absorber having an effective grooved tube wall without cutting into the tube wall.

It is the still further object of the present invention to provide an improved construction for a shock absorber piston.

It is another object of the herein disclosed invention to provide an improved economical construction for a shock absorber.

Other objects and uses of the instant invention will become apparent to those skilled in the art upon perusal of the specification and the accompanying drawings which show:

FIGURE 1 is a cross sectional view of a double acting shock absorber embodying the instant invention with parts cut away to show better the construction of the shock absorber;

FIGURE 2 is a cross sectional view of the shock absorber shown in FIGURE 1 with the shock absorber displaced to the right;

FIGURE 3 is an enlarged cross sectional view showing the piston in the shock absorber of FIGURE 1 with the piston in a balanced position;

FIGURE 4 is a cross sectional view taken on line 4—4 in FIGURE 3;

FIGURE 5 is a cross sectional view taken on line 5—5 in FIGURE 3.

Referring now to the drawings and especially to FIGURE 1 which shows a double acting hydraulic shock absorber generally indicated by numeral 10 which shock absorber embodies the present invention. The shock absorber 10 generally includes a cylinder 12 filled with hydraulic fluid or oil, a piston 14 mounted in the cylinder and a shaft 16 supporting the piston. The double acting shock absorber in this instance is one in which the shaft 16 is fixed and the cylinder 12 moves relative to the shaft. The shock absorber has its shaft 16 fixed on a pair of pedestals 18 and 20 which are in turn fixed to a supporting surface such as a floor. A force is applied to the cylinder 12 through a cushion assembly 22 to displace the cylinder relative to the shaft.

The construction of cylinder 12 is conventional in that it includes a tube 24 and a pair of heads 26 and 28 which seal the ends of the tube. Shaft 16 extends through tube 24 and is concentric with the tube. Heads 26 and 28 have glands 30 and 32 respectively which seal the space between the head and the shaft.

Mounted on the central portion of tube 14 is the cushion assembly. The tube 24 contains an annular groove 34 in the center of its outer surface, and a split cushion ring 36 is mounted in said groove. Ring 36 is a split ring which has its halves welded onto the tube. The assembly 22 also includes a pair of rubber rings 38 and 40, each of which rubber rings has an elliptical cross section. The major axis of each elliptical cross section is parallel to the longitudinal axis of the cylinder.

An annular cover 41 is slidedly mounted on the tube 24. The cover includes a pair of annular loading rings 42 and 43 which engage the two rubber rings 38 and 40 respectively so that in a longitudinal direction the cover is resiliently mounted on the tube. Tube 24 has a pair of annular grooves 44 and 46 in its outer surface which grooves are distantly spaced from the annular groove 34. The grooves 44 and 46 receive stop rings 48 and 50 respectively. The stop rings 48 and 50 are also split rings which are welded to the tube. It may be seen that the annular cover 42 engages either of the stop rings 48 and 50 when a force is applied to one side or the other of the cover so that a particular rubber ring is compressed and the cover is then slid into engagement with the appropriate stop ring.

The cylinder 12 includes a metering sleeve which in the present instance consists of two sleeve elements 52 and 54. The metering sleeves 52 and 54 include tapered slots 56 and 58 respectively. The tapered slots are cut out portions in the metering sleeves which open at one end of each of the sleeves. The slots 56 and 58 are designed for a particular loading characteristic. The width of the slot at a particular point determines the resistance of the shock absorber. The metering sleeves 52 and 54 are positioned inside tube 24 with the ends of the sleeves having the slots contained therein adjacent to each other. A stop ring 60 or tube abutment, which has a plurality of radially extending grooves 62 on opposite faces, is positioned between the metering sleeves with the sleeves in engagement with said faces to provide a stop means. Each of the sleeves extends from the stop ring to its respective head so that each sleeve is securely held in position, and the sleeves hold the stop ring 60 in a fixed position. The outside diameter of the metering sleeves is substantially the same as the inside diameter of the tube 24, so that that cooperation of the slotted sleeves and the tube provides a pair of effective grooves in the tube extending outward from the ring.

Referring now to FIGURE 3 which shows piston 14 in detail, it may be seen that the piston generally consists of two identical halves which are expandable relative to each other. The piston is mounted on shaft 16 which has an annular groove 64 in the center of the shaft. A lock ring or rod abutment 66 is welded in the groove 64 and is a part of the piston 14. The piston includes a pair of piston collars 68 and 70 separated by the lock ring. Collar 68 is slidedly mounted on the left hand of shaft 16 and collar 70 is slidedly mounted on the right hand half of the shaft.

The piston collars 68 and 70 have piston plates 72 and 74 respectively fixed on the respective collars. Piston plates 72 and 74 include bodies 76 and 78 respectively which bodies have a plurality of orifices 80 and 82 respectively extending through the respective bodies. The bodies 76 and 78 have flanges 84 and 86 respectively formed integral with the respective bodies and the flanges extend outwardly. The flanges 84 and 86 are in slideable and sealing engagement with the metering sleeves 52 and 54 respectively so that a fluid easily cannot pass between the plates and the respective sleeves. The piston plates 72 and 74 have valve plate surfaces 88 and 90 respectively on oppositely extending sides to provide convenient sealing surfaces. Annular spring collars 92 and 94 are mounted on the piston collars 68 and 70 respectively. The spring collars 92 and 94 are held in position by clamp rings 96 and 98 which fit in grooves 100 and 102 respectively which grooves are in their respective collars. The spring collars 92 and 94 are held in the respective opposite directions by annular shoulders 104 and 106 respectively in the respective piston collars 68 and 70. The collars 92 and 94 have annular plate spring apertures 108 and 110 respectively, and return spring flanges 112 and 114 are formed integral within the outer surface of the respective collars 92 and 94. Orifice valves 116 and 118 are positioned between the respective spring collars 92 and 94 and their respective piston plates. Each of the orifice valves is an annular plate which engages its respective valve surfaces to close off the orifices which extend through the respective body. A plurality of valve springs 120 and 122 is mounted in the spring orifices 108 and 110 respectively. The valve springs urge each of the valves into engagement with the respective valve surfaces to insure sealing the orifices 80 and 82 during the operation of the cylinder.

The piston 14 is held in the center of the cylinder 12 by a pair of return springs 124 and 126. One end return spring 124 is mounted in engagement with the spring flange 112 of spring collar 92. The other end of the return spring 124 engages the cylinder head 26, so that spring 124, which is a compression spring, constantly urges its respective spring collar and the entire left half of the piston toward the lock ring 60. The other return spring 126 is also a compression spring and it has one end mounted in engagement with the spring flange 114 of spring collar 94. The other end of return spring 126 is in engagement with the cylinder head 28 so that the spring urges the spring collar 94 and the entire right half of the piston toward the lock ring 60. Thus, the piston plates 72 and 74 are normally held in engagement with the lock ring 60 by the return springs.

The operation of the shock absorber is such that should a disturbing force be applied to the cylinder, the cylinder would move and carry with it one half of the piston so that the fluid would be forced to flow past that half of the piston. When a sufficient disturbing force is applied, the shock absorber operates in the following manner. When a force is applied in a direction to move the cylinder to the right and the rod, relatively, to the left, the rod abutment 66 engages the valve plate 72, lifting the valve plate away from the tube abutment and carrying it to the left as shown in FIG. 2. The displaced fluid is blocked against passage through the orifices in the valve plate by reason of the seating of the valve 116 so that the fluid crowds around the valve plate through the slot 56 cut in the sleeve 52. As the valve plate moves, the effective orifice provided by the slot 56 becomes smaller to produce progressive throttling action so that the load is brought to a stop with smooth deceleration and with no substantial risk of bottoming on the end of the cylinder. Moreover, it will be apparent to one skilled in the art that if the resilient rings 38, 40 are made of relatively stiff material, they will resist deformation until the end of the normal piston stroke and provide a resilient "reserve" in the face of excessive forces.

Movement of the rod relatively to the left leaves the second valve plate 74 seated on the stop ring or tube abutment 60.

When the force is relieved, the restoring force of the spring 124 tends to restore the parts to their original position, with the valve 116 being unseated so that fluid flows freely through the openings in the valve plate 72. Accuracy is insured since the springs tend constantly to aline the rod and tube abutments 66 and 60. No accumulator is required since the relative movement of the piston rod does not change the net volume available to the fluid in the shock absorber.

Inasmuch as the other half of piston 14 has the identical construction, it is evident that the piston plate 74 works in a like manner when a force is applied from the right to move the cylinder to the left so that the return spring 126 is compressed. It is also evident that the piston plate 74 would return to its original position against stop ring 60 which is its original position. Thus the present construction does not depend upon the use of balance springs to return the cylinder to its balanced position. Rather, the cylinder always returns to its original position when the disturbing force is removed. There is no opportunity for variance due to wear or fatigue of the parts.

While a specific embodiment of the present invention has been shown and described herein, it will be obvious to those skilled in the art that many variations and modifications may be made of the present invention without departing from the spirit and scope of this invention as defined in the appended claims.

What is claimed is:

1. A double acting shock absorber comprising, a cylinder having an elongated circular tube and a pair of heads closing the ends of said tube, said cylinder filled with a fluid, a piston shaft extending through said tube and movably mounted in said heads, a pair of metering sleeves concentric with the tube and in engagement with the interior surface of the tube, each of said metering sleeves having a tapered slot opening at one end of the respective sleeve, said sleeves having their ends with the slot openings adjacent to each other, a limit ring between the adjacent ends of the sleeves, said limit ring having a plurality of radial grooves in opposed surfaces adjacent to the sleeves, a piston mounted on said shaft, said piston including a lock ring fixed to said shaft, a pair of piston collars slidedly mounted on said shaft and engageable with the lock ring for limited movement relative to the shaft, one of said collars mounted between one of the heads and the lock ring, the other of said collars mounted between the other of said heads and the lock ring, a piston plate fixed to each of said piston collars, each of said plates in slideable engagement with the metering sleeves and engageable with the limit ring for limited movement relative to its respective metering sleeve, each of said plates having a plurality of flow orifices extending therethrough, an annular orifice valve moveably mounted on each collar and engageable with the piston plate for closing the flow orifices, and spring means urging each of said orifice valves into engagement with its respective piston plate, and a pair of return springs urging the piston plates into an engagement with the limit ring, each of said return springs being a compression spring extending from one head to its respective piston collar, whereby displacement of the cylinder relative to the shaft moves one of said piston plates relative to the cylinder while the other of said piston plates does not move relative to the cylinder and fluid displaced by the moved piston plate collects between the two piston plates.

2. A double acting shock absorber comprising a cylinder having an elongated circular tube and a pair of heads closing the ends of said tube, a shaft extending through said tube and moveably mounted in said heads, a limit ring fixed inside said cylinder and a piston mounted on said shaft engageable with said limit ring, said piston including a lock ring fixed to said shaft, a pair of piston collars slidably mounted on said shaft and engageable with the lock ring for limited movement relative to the shaft, one of said collars mounted between one of the heads and the lock ring, the other of said collars mounted between the other of said heads and the lock ring, a piston plate fixed to each of said piston collars, each of said plates in slideable engagement with the cylinder, each of said plates having a plurality of flow orifices extending therethrough, an annular orifice valve moveably mounted on each collar and engageable with the piston plate for closing the flow orifices, and a pair of return springs urging the plates into engagement with the limit ring, each of said return springs being a compression spring extending from one head to its respective piston collar, whereby displacement of the shaft relative to the cylinder moves one of the piston plates relative to the cylinder to compress a fluid between the piston plate and a head so that the compressed fluid flows into the space between the piston plates.

3. In a double acting shock absorber comprising a cylinder having an elongated circular tube and a pair of heads closing the ends of said tube, a piston shaft extending through said tube and moveably mounted in said heads, stop limit means mounted in said cylinder, a piston mounted in said cylinder and on said shaft, said piston including a pair of piston plates engageable with said stop limit means, each of said plates having an orifice therethrough, means regulating flow through each of said orifices, means urging each of said piston plates into engagement with the stop limit means, and means mounted on said shaft for holding one of said piston plates relative to the shaft while the other of said piston plates is held relative to the cylinder while the shaft moves relative to the cylinder.

4. A double acting shock absorber comprising a cylinder having an elongated circular tube and a pair of heads closing the ends of said tube, said cylinder filled with a hydraulic fluid, a piston shaft extending through said tube and moveably mounted in said heads, a lock ring fixed to said shaft, a pair of piston collars slidedly mounted on said shaft and engageable with said lock ring for limited movement relative to the shaft, one of said collars mounted between one of the heads and the lock ring, and the other of said collars mounted between the other of said heads and the lock ring, a piston plate fixed to each of said piston collars, each of said piston plates in slideable engagement with the cylinder, a limit ring mounted on the interior of said cylinder and engageable with the piston plates, each of said piston plates having a plurality of flow orifices extending therethrough, an annular flow valve moveably mounted on each collar and engageable with the respective piston plate for closing the flow orifices, a spring collar mounted on each piston collar, a plurality of springs urging each annular orifice valve into engagement with the respective piston plate for closing the flow orifices, and a pair of return springs urging the piston plates into engagement with the limit ring, each of said return springs being a compression spring, having one end in engagement with one cylinder head and the other end in engagement with the respective spring collar, whereby movement of the piston shaft relative to the cylinder moves one of the piston plates against the force of the compression spring, and releasing a displacing force allows the return spring to move the piston plate into engagement with the limit ring and displace hydraulic fluid to flow through the flow orifices and open the orifice valves against the action of the valve springs.

5. A double acting shock absorber comprising a cylinder, said cylinder having a pair of heads closing the opposite ends of said cylinder, said cylinder filled with a fluid, a piston shaft moveably mounted in said cylinder, a piston mounted on said shaft within said cylinder, said piston including a pair of piston collars slidedly mounted on said shaft, lock means mounted on said shaft between said piston collars for limiting the movement of said piston collars, a piston plate fixed to each of said piston collars, each of said plates having its outside diameter substantially equal to the inside diameter of the cylinder, each of said plates having a plurality of flow orifices extending therethrough, a flow orifice valve mounted on each collar for closing the flow orifices when piston plate is moving in one direction, limit means mounted on said cylinder between said piston plates, and means urging said piston collars into engagement with said lock means, whereby the movement of the piston shaft relative to the cylinder locks one of the piston plates to the piston shaft for movement relative to the cylinder while the other plate is locked to the cylinder by the limit means for movement relative to the piston shaft and the distance between the piston plates increases with the amount of relative movement between the piston shaft and the cylinder so that the space between the piston plates defines the volume for receiving fluid displaced by the movement of one of the plates relative to the cylinder.

6. In a shock absorber the combination comprising a tube having heads on the respective ends thereof, a piston rod telescoped through said tube and through the heads and sealed with respect to the latter, a pair of piston plates slidable on said rod, an abutment at the center of said tube, coil springs in said tube and pressing against the respective plates for urging them toward the center of the tube for bottoming on said abutment, an abutment on said rod interfering relation with each of said plates so that one of the plates is carried bodily with the rod upon movement of the rod in one direction from its centered position and so that the other of said plates is carried bodily by said rod upon movement of the rod in the other direction, the space in said tube being filled with liquid, and a metering sleeve in said tube having a metering slot formed therein having its greatest width at the center of the tube and having decreasing width as measured in each direction from the center of the tube for bypassing the liquid around the moving one of the piston plates with progressive throttling action thereby to inhibit relative movement of the rod in said tube in either direction.

7. In a double acting shock absorber the combination comprising a tube having heads on the respective ends thereof, a piston rod telescoped through said tube and the heads and sealed with respect to the latter, a pair of piston plates fitted on said shaft for relative sliding movement thereon, a tube abutment longitudinally centered inside said tube, springs in said tube for urging the respective piston plates toward the center of said tube and toward bottoming engagement with the tube abutment, means including a rod abutment longitudinally centered on the rod between said piston plates and in interfering relation with respect to the piston plates so that when the rod is moved endwise in the tube in one direction one of said plates is lifted off of the tube abutment for bodily movement with the rod in said one direction and so that when the rod is moved endwise in the other direction the other piston plate is lifted off of the abutment for bodily movement with the rod in said other direction, the space within said tube being filled with liquid, and means defining a restricted passage for throttled bypassing of the liquid about the moved piston plate thereby impeding the relative movement of the rod and tube in either direction.

8. In a double acting shock absorber the combination comprising a tube having heads on the respective ends thereof, a piston rod telescoped through said tube and the heads and sealed with respect to the latter, a pair of piston plates fitted on said shaft for relative sliding movement thereon, a tube abutment longitudinally centered inside said tube, springs in said tube for urging the respective piston plates toward the center of said tube and toward bottoming engagement with the tube abutment, means including a rod abutment longitudinally centered on the rod between said piston plates and in interfering relation with respect to the piston plates so that when the rod is moved endwise in the tube by an externally applied force in one direction one of said plates is lifted off of the tube abutment for bodily movement with the rod in said one direction and so that when the shaft is moved endwise in the other direction the other piston plate is lifted off of such abutment for bodily movement with the rod in said other direction, the space within said tube being filled with liquid, means defining a restricted passage for throttled transfer of the liquid about the moved piston plate during movement of the plate from centered position for thereby impeding the relative movement of the rod and tube, and means defining an opening through each of said piston plates normally closed by a check valve for permitting relatively rapid return of the transferred liquid for rapid restoring of the moved piston plate to its centered position by the associated spring when the externally applied force is removed.

References Cited in the file of this patent

UNITED STATES PATENTS

| | | |
|---|---|---|
| 1,744,514 | Thompson | Jan. 21, 1930 |
| 2,040,262 | Kruckenberg et al. | May 12, 1936 |
| 2,557,274 | Geisse | June 19, 1951 |
| 2,629,462 | Peek | Feb. 24, 1953 |
| 2,636,726 | Mercier | Apr. 28, 1953 |